United States Patent
Fukuhara

(10) Patent No.: US 11,983,453 B1
(45) Date of Patent: May 14, 2024

(54) PRINTING APPARATUS AND PRINTING SETTING METHOD

(71) Applicant: Toshiba Tec Kabushiki Kaisha, Tokyo (JP)

(72) Inventor: Takanori Fukuhara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/192,357

(22) Filed: Mar. 29, 2023

(51) Int. Cl.
*G06F 3/12* (2006.01)
*G06K 15/00* (2006.01)

(52) U.S. Cl.
CPC .......... *G06F 3/1257* (2013.01); *G06F 3/1204* (2013.01); *G06F 3/1251* (2013.01); *G06K 15/4065* (2013.01)

(58) Field of Classification Search
CPC .... G06F 3/1257; G06F 3/1204; G06F 3/1251; G06K 15/4065
USPC ......................................................... 358/1.1
See application file for complete search history.

(56) References Cited

U.S. PATENT DOCUMENTS

| | | | |
|---|---|---|---|
| 2013/0214478 A1* | 8/2013 | Yoshida | B65H 7/20 271/145 |
| 2015/0002565 A1* | 1/2015 | Maeda | B41J 11/008 347/5 |
| 2015/0002572 A1* | 1/2015 | Maeda | B41J 11/008 347/16 |
| 2015/0002883 A1* | 1/2015 | Hibi | G06K 15/4065 358/1.14 |
| 2020/0249889 A1* | 8/2020 | Igarashi | G03G 15/5029 |
| 2020/0293235 A1 | 9/2020 | Chew | |
| 2021/0276819 A1* | 9/2021 | Morimoto | B41J 11/003 |

* cited by examiner

*Primary Examiner* — Allen H Nguyen
(74) *Attorney, Agent, or Firm* — FOLEY & LARDNER LLP

(57) ABSTRACT

A printing apparatus includes a sensor and a processing circuit. The sensor detects a width of a printing medium. The processing circuit acquires detected width information based on detection of the width by the sensor. The processing circuit applies, if printing setting information on the width indicated by the detected width information is stored in a storage unit, a printing setting to the printing apparatus based on the printing setting information on the width indicated by the detected width information.

14 Claims, 7 Drawing Sheets

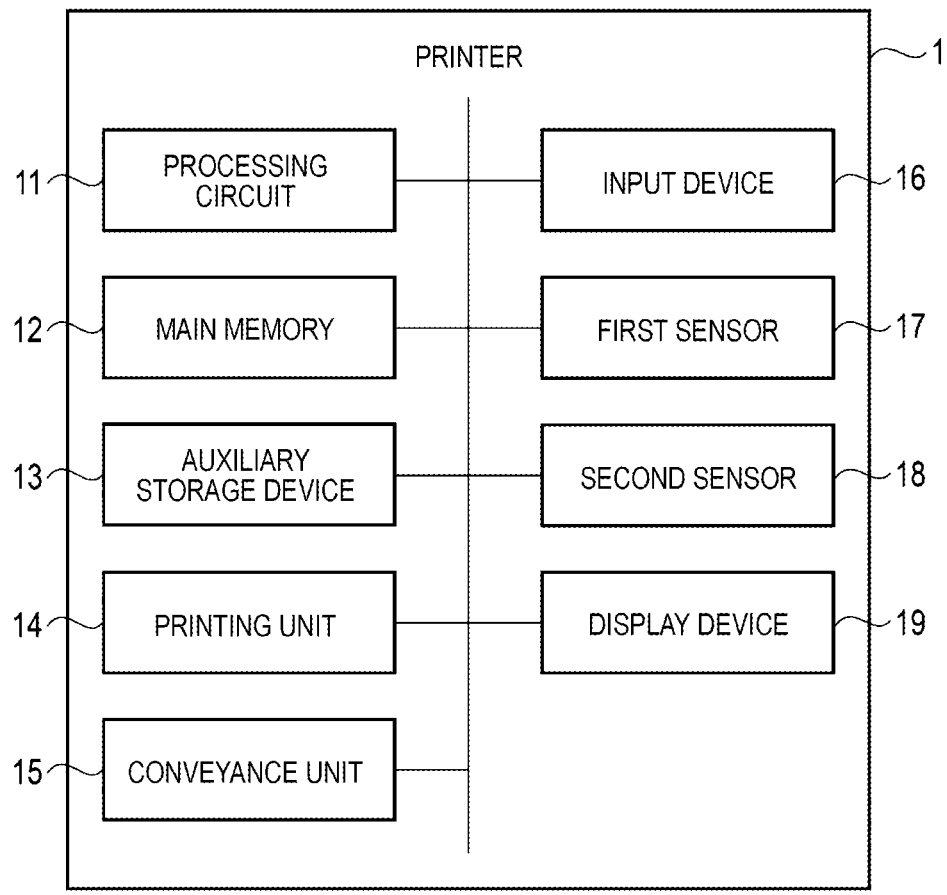

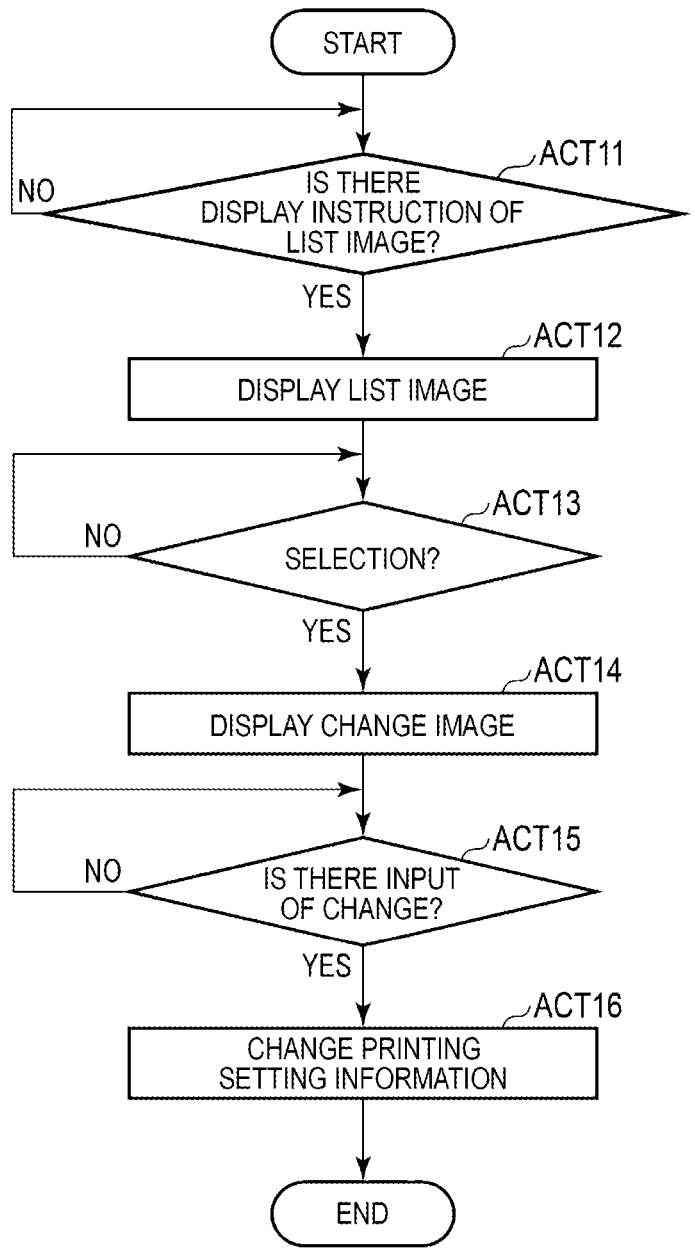

PRINTING APPARATUS AND PRINTING SETTING METHOD

FIELD

Embodiments described herein relate generally to a printing apparatus and a printing setting method.

BACKGROUND

A printing apparatus such as a thermal printer includes a sensor configured to detect a width of a printing medium. The printing apparatus can execute printing processes on printing media having various widths Based on an input of printing setting information on the detected width of the printing medium, the printing apparatus executes a printing process corresponding to a printing setting based on the printing setting information.

However, a user is required to the input printing setting information on the width of the set printing medium each time the printing medium is set in a printing apparatus.

Therefore, there is a need to efficiently apply, to a printing apparatus, a printing setting corresponding to a width of a printing medium.

DESCRIPTION OF THE DRAWINGS

FIG. 2 is a block diagram showing the outline of the configuration of the printer;

FIG. 3 is a diagram showing an example of a data structure of information stored in the printer according to one embodiment;

FIG. 8 is a flowchart showing an example of the process of changing the printing setting information by the printer according to one embodiment.

DETAILED DESCRIPTION

In general, according to one embodiment, a printing apparatus includes a sensor and a processing circuit. The sensor detects a width of a printing medium. The processing circuit acquires detected width information from the sensor based on the detected the width. If the printing setting information on the width indicated by the detected width information is stored in a storage unit, the processing circuit applies a printing setting to the printing apparatus based on the printing setting information on the width indicated by the detected width information.

Hereinafter, embodiments will be described with reference to the drawings. It is noted that the scale of each unit in each drawing used for the description of the following embodiments may be changed appropriately. Further, in each drawing used for the description of the following embodiments, a configuration may be omitted for the description.

Figure 1:
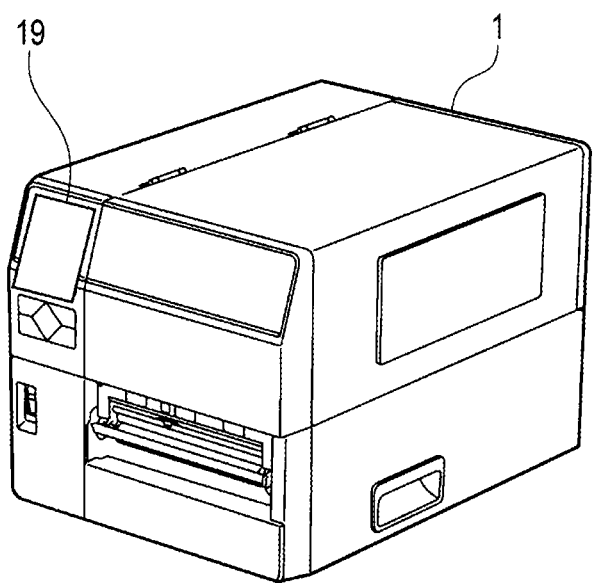
FIG. 1 is an external view showing an outline of a configuration of a printer according to an embodiment.

FIG. 1 is an external view showing an outline of a configuration of a printer 1 according to at least one embodiment.

The printer 1 is an apparatus configured to perform a printing function. Printing includes printing an image on a printing medium. Images include not only characters but also patterns and the like. Printing includes typing. A printing medium is a medium on which an image can be printed. For example, the printing medium is a roll of paper, but the printing media may also be a different type of medium. The printer 1 can set the printing media having various widths. For example, the printer 1 may be a label printer or a receipt printer, but the printer 1 may be a different type of printer 1 from the label printer or the receipt printer. The printer 1 is an example of a printing apparatus having a printing function.

The printer 1 includes a display device 19. The display device 19 is a device capable of displaying various images (e.g., pictures, messages, instructions, etc.). The display device 19 may be a liquid crystal display, an organic electroluminescence (EL) display, or the like, but is not limited thereto. The display device 19 is an example of a display unit (e.g., device, screen, etc.) of the printer 1.

FIG. 2 is a block diagram showing an outline of a configuration of the printer 1 according to at least one embodiment.

The printer 1 includes, in addition to the display device 19 described above, a processing circuit 11, a main memory 12, an auxiliary storage device 13, a printing unit (e.g., printer, printing device, etc.) 14, a conveyance unit (e.g., conveyer, etc.) 15, an input device 16, a first sensor 17, and a second sensor 18.

The processing circuit 11 corresponds to the central portion of the printer 1. The processing circuit 11 is one element forming a computer of the printer 1. The processing circuit 11 includes a processor, such as a central processing unit (CPU). The processing circuit 11 may be formed of, in addition to or instead of the CPU, various circuits such as an application specific integrated circuit (ASIC), a field programmable gate array (FPGA), and a graphics processing unit (GPU). The processing circuit 11 loads a program previously stored in the main memory 12 or the auxiliary storage device 13 in the main memory 12. The program causes the processing circuit 11 to execute processes of each unit as will be described later. The processing circuit 11 executes various pieces of processing by executing programs loaded in the main memory 12.

The main memory 12 includes an element corresponding to the main memory portion of the printer 1. The main memory 12 is one element forming the computer of the printer 1. The main memory 12 includes a non-volatile memory area and a volatile memory area. The main memory 12 stores an operating system or a program in the non-volatile memory area. The main memory 12 uses the volatile memory area as a work area in which data is appropriately rewritten by the processing circuit 11. For example, the main memory 12 includes a read only memory (ROM) as the non-volatile memory area. For example, the main memory 12 also includes a random access memory (RAM) as the volatile memory area.

The auxiliary storage device 13 corresponds to the auxiliary storage portion of the printer 1. The auxiliary storage device 13 is an electric erasable programmable read-only memory (EEPROM (registered trademark)), a hard disc drive (HDD), a solid state drive (SSD), a flash memory, or the like, but the same is not limited thereto. The auxiliary storage device 13 stores the above-described programs, data to be used if the processing circuit 11 performs various pieces of processing, and data generated by the processing of the processing circuit 11. The auxiliary storage device 13 is an example of a storage unit (e.g., storage device) or a memory.

The auxiliary storage device 13 stores registered width information and printing setting information on each of one or more registered printing medium widths. The printing setting information on one registered printing medium width is correlated with registered width information on one registered printing medium width.

The registered printing medium width is a width of a printing medium detected by the first sensor 17, and printing setting information on the registered printing medium width is registered. Registration of the printing setting information includes storing the printing setting information in the auxiliary storage device 13. The registered width information is information indicating the registered printing medium width. For example, if the printing medium is a of roll paper of 50 mm, the registered width information is information indicating 50 mm.

The printing setting information is information indicating a printing setting to be applied to the printer 1. The printing setting is a setting related to printing process to be executed on a printing medium by the printing unit (e.g., printing device, print device, 14. For example, the printing setting includes at least one of a printing start position, a printing resolution, and a printing density, but the same may include other settings. The printing setting information is information serving as a template of a printing setting in one registered printing medium width. The printing start position is a position in the width direction of the printing medium at which printing is started, and is a position from the end in the width direction of the printing medium. Here, the center position in the width direction of the printing medium is set at the same position of the printer 1 regardless of the type of printing medium. Therefore, the processing circuit 11 can adjust the printing start position based on the center position in the width direction of the printing medium and detected width information to be described later. The printing resolution is a resolution for printing on a printing medium. The printing density is a density for printing on a printing medium.

A user can use the input device 16 to input a printing setting related to one printing medium width for each printing medium width. Inputting a printing setting includes inputting a printing setting related to one new printing medium width. Inputting a printing setting includes inputting a change of at least one setting included in a printing setting indicated by printing setting information stored in the auxiliary storage device 13. An example of a data structure of information stored in the auxiliary storage device 13 will be described later.

The printing unit (e.g., printing device, print device, etc.) 14 is a unit configured to execute printing processing on a printing medium. The printing unit (e.g., printing device, print device, printer, etc.) 14 includes a head configured to print an image on a printing medium. The head may have a function of printing an image on a printing medium. Here, any printing methods may be performed by the head as described below. If a printing medium has a heat-sensitive layer, the head may print an image on the printing medium having the heat-sensitive layer with heat generated from each heating element. The head may print an image on a printing medium by melting ink contained in an ink ribbon with heat generated by each heating element. The head may print an image on a printing medium by inkjet.

The conveyance unit (e.g., conveyer) 15 is a unit configured to convey a printing medium. The conveyance unit (e.g., conveyer) 15 includes a plurality of conveyance rollers. The plurality of conveyance rollers convey the printing medium.

The input device 16 is a device capable of inputting an instruction based on a user's operation. The input device 16 may include a pressable button. The input device 16 may include a touch panel formed to be integrated with the display device 19.

The first sensor 17 is a sensor configured to detect a printing medium width. The printing medium width is a width of a printing medium set in the printer 1. Detecting the printing medium width includes detecting the size of the printing medium width. A detection method by the first sensor 17 may be a contact type or a non-contact type, and is not limited thereto.

The second sensor 18 is a sensor configured to detect one or both of an open state and a closed state of a part of a housing of the printer 1. The open state is a state in which a part of the printer 1 is open with respect to the other portion. The closed state is a state in which a part of the printer 1 is closed with respect to the other portion. A user replaces a printing medium after opening a part of the housing of the printer 1, and after replacing the printing medium, the user closes the part of the housing of the printer 1. A detection method by the second sensor 18 may be a contact type or a non-contact type, and is not limited thereto.

The hardware configuration of the printer 1 is not limited to the configuration described above. The printer 1 can appropriately omit and modify the above-described components and add a new component.

FIG. 3 is a diagram showing an example of a data structure of information stored in the auxiliary storage device 13.

The auxiliary storage device 13 stores registered width information on each of one or more registered printing medium widths. The auxiliary storage device 13 stores printing setting information on each of one or more registered printing medium widths. In the example shown in FIG. 3, the printing setting information includes information indicating a setting of a printing start position, information indicating a setting of a printing resolution, and information indicating a setting of a printing density. For example, if 50 mm is the registered printing medium width, printing setting information on 50 mm is correlated with registered width information on 50 mm.

Figure 4:
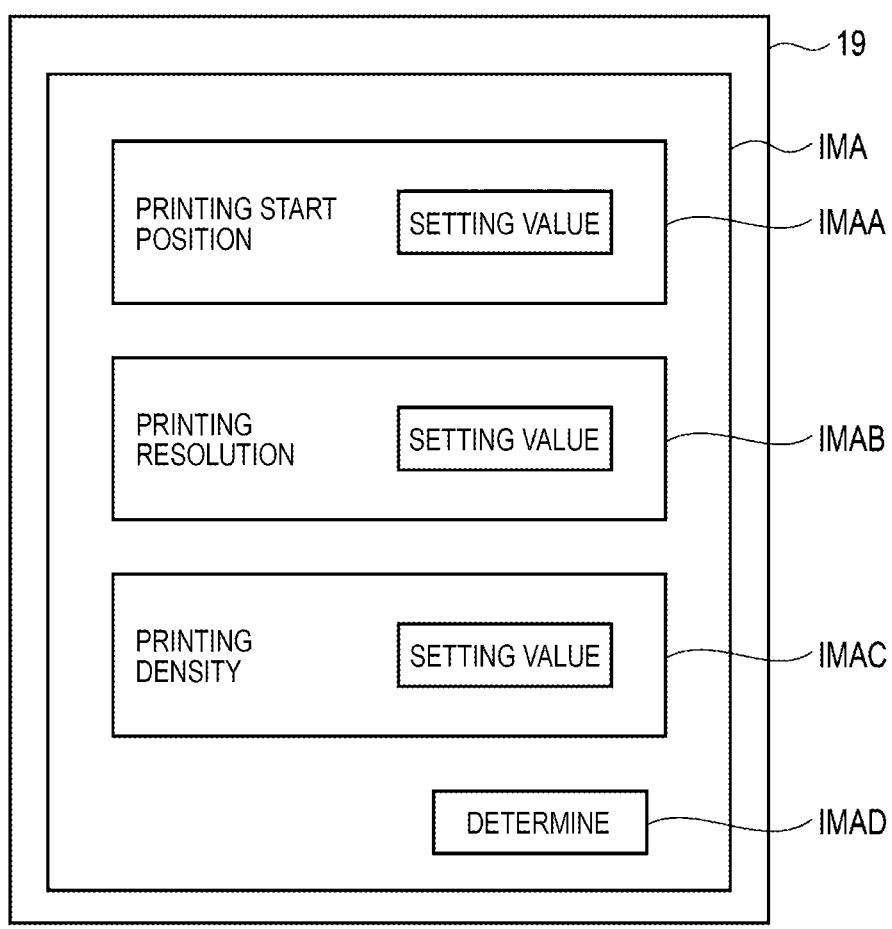
FIG. 4 is a diagram showing a display example of a setting image on the printer according to one embodiment.

FIG. 4 is a diagram showing a display example of a setting image IMA on the display device 19.

The display device 19 displays the setting image IMA. The setting image IMA is a setting image capable of inputting a printing setting related to a printing medium width indicated by detected width information. The detected width information is information indicating a printing medium width detected by the first sensor 17. For example, the setting image IMA is capable of inputting at least one setting of the printing start position, the printing resolution, and the printing density. A user can easily set at least one of the printing start position, the printing resolution, and the printing density using the setting image IMA. The setting image IMA includes a display area for each setting included in a printing setting. The display area for each setting included in the printing setting may include a touch key (e.g., a touch pad8/, touchscreen, etc.) capable of inputting a setting. A user can use the input device 16 to input a printing setting related to a printing medium width indicated by detected width information. The setting image IMA is an example of an image capable of inputting the printing setting related to the width indicated by the detected width information.

In the example shown in FIG. 4, the setting image IMA includes a display area IMAA related to a setting of a printing start position. The display area IMAA related to the setting of the printing start position may include a touch key capable of inputting the setting of the printing start position. The setting image IMA includes a display area IMAB related to a setting of a printing resolution. The display area IMAB related to the setting of the printing resolution may include a touch key capable of inputting the setting of the printing resolution. The setting image IMA includes a display area IMAC related to a setting of a printing density. The display area IMAC related to the setting of the printing density may include a touch key capable of inputting the setting of the printing density. The setting image IMA may include a touch key IMAD configured to determine the printing setting input in the setting image IMA.

Figure 5:
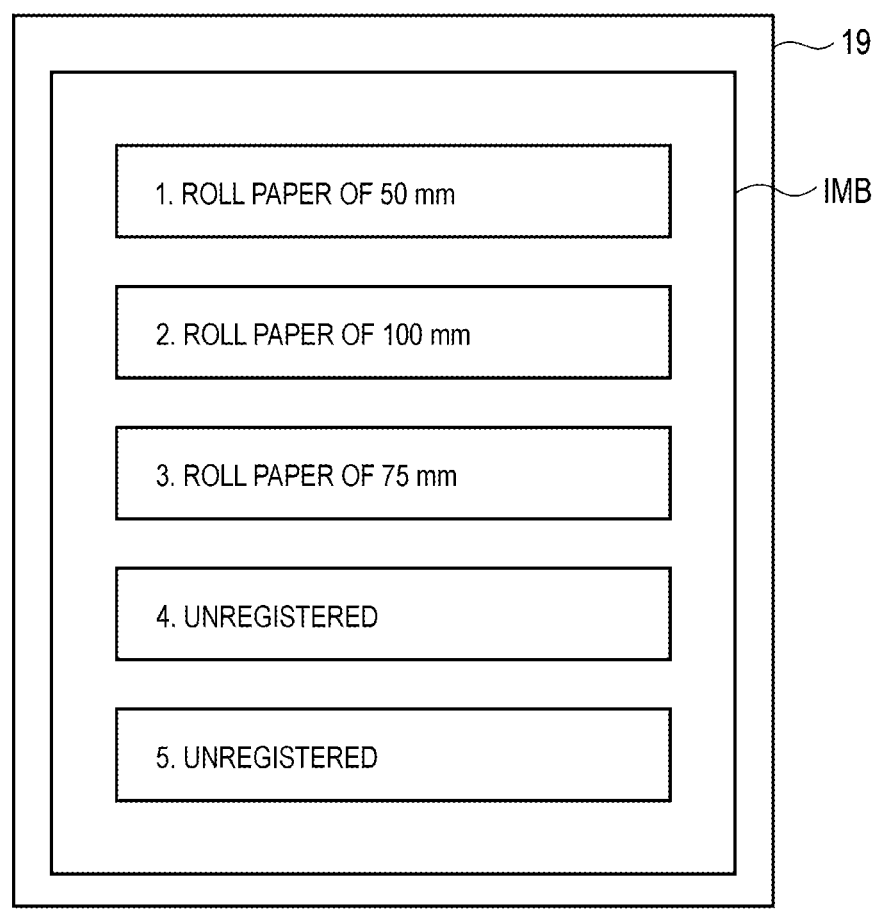
FIG. 5 is a diagram showing a display example of a list image on the printer according to one embodiment.

FIG. 5 is a diagram showing a display example of a list image IMB on the display device 19.

The display device 19 displays the list image IMB. The list image IMB is a list image showing a list of one or more registered printing medium widths. The list image IMB is also an image capable of selecting, from a list of one or more registered printing medium widths, one registered printing medium width that changes printing setting information. The list image IMB includes a display area related to each of the one or more registered printing medium widths. The display area related to each of the one or more registered printing medium widths may include a touch key capable of selecting one registered printing medium width that changes the printing setting information.

A user can select one registered printing medium width that changes the printing setting information by using the input device 16. Here, at least three printing medium widths of 50 mm, 100 mm, and 75 mm are assumed to be registered printing medium widths. The list image IMB is an example of an image showing a list of widths of one or more printing media. Here, the printing setting information on each of the widths of one or more printing media is registered.

Figure 6:
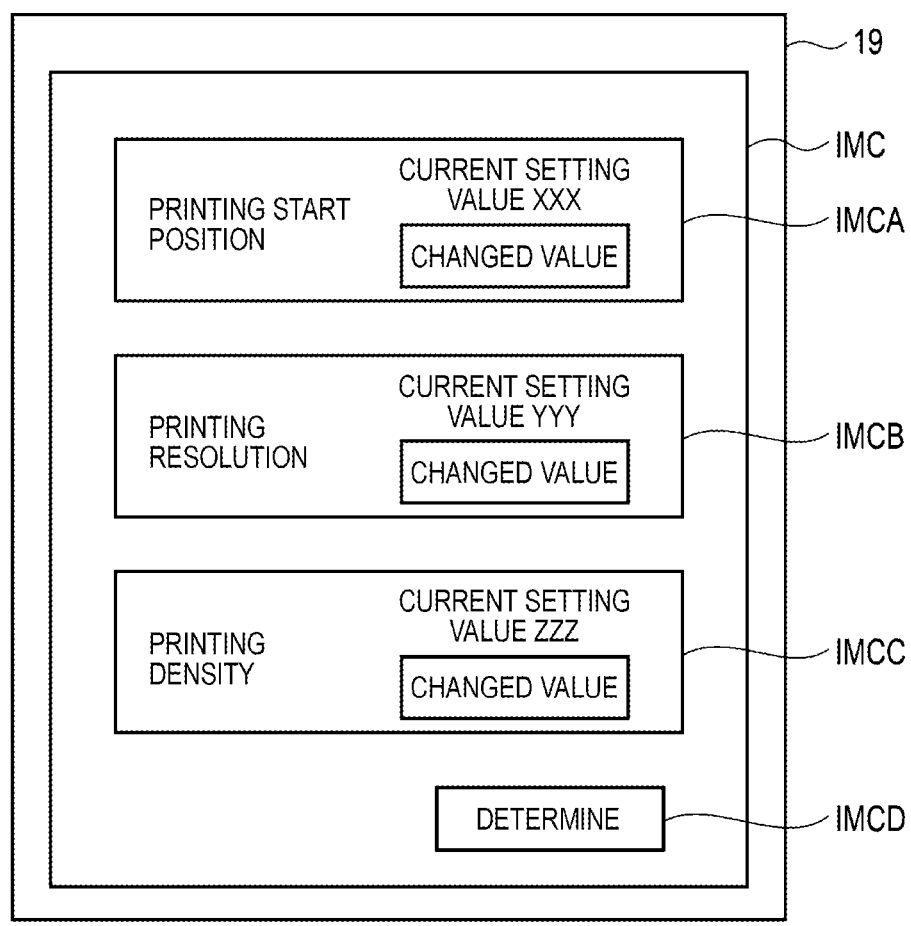
FIG. 6 is a diagram showing a display example of a change image on the printer according to one embodiment.

FIG. 6 is a diagram showing a display example of a change image IMC on the display device 19.

The display device 19 displays the change image IMC. The change image IMC is a change image capable of changing a printing setting related to one registered printing medium width selected in the list image IMB. For example, the change image IMC is capable of inputting a change in at least one setting of the printing start position, the printing resolution, and the printing density. The change image IMC includes a display area for each setting included in the printing setting. The display area for each setting included in the printing setting may display a current setting indicated by the printing setting information. The display area for each setting included in the printing setting may include a touch key capable of inputting a change in setting. A user can use the input device 16 to input a change in at least one setting included in the printing setting related to one registered printing medium width selected from the list image IMB. The change image IMC is an example of an image capable of changing a printing setting related to a selected width.

In the example shown in FIG. 6, the change image IMC includes a display area IMCA related to a setting of a printing start position. The display area IMCA related to the setting of the printing start position may display a setting of a current printing start position indicated by printing setting information. The display area IMCA related to the setting of the printing start position may include a touch key capable of inputting a change in the setting of the printing start position. The change image IMC includes a display area IMCB related to a setting of a printing resolution. The display area IMCB related to the setting of the printing resolution may display a setting of a current printing resolution indicated by the printing setting information. The display area IMCB related to the setting of the printing resolution may include a touch key capable of inputting a change in the setting of the printing resolution. The change image IMC includes a display area IMCC related to a setting of a printing density. The display area IMCC related to the setting of the printing density may display a setting of a current printing density indicated by the printing setting information. The display area IMCC related to the setting of the printing density may include a touch key capable of inputting a change in the setting of the printing density. The change image IMC may include a touch key IMCD configured to determine a change in the printing setting input in the change image IMC.

Next, a description will be given as to a process executed by the processing circuit 11 of the printer 1.

It is noted that a processing procedure described below is merely an example, and each processing may be changed appropriately. In addition, with respect to the processing procedure described below, steps can be omitted, replaced, and added as appropriate according to the embodiment.

Figure 7:
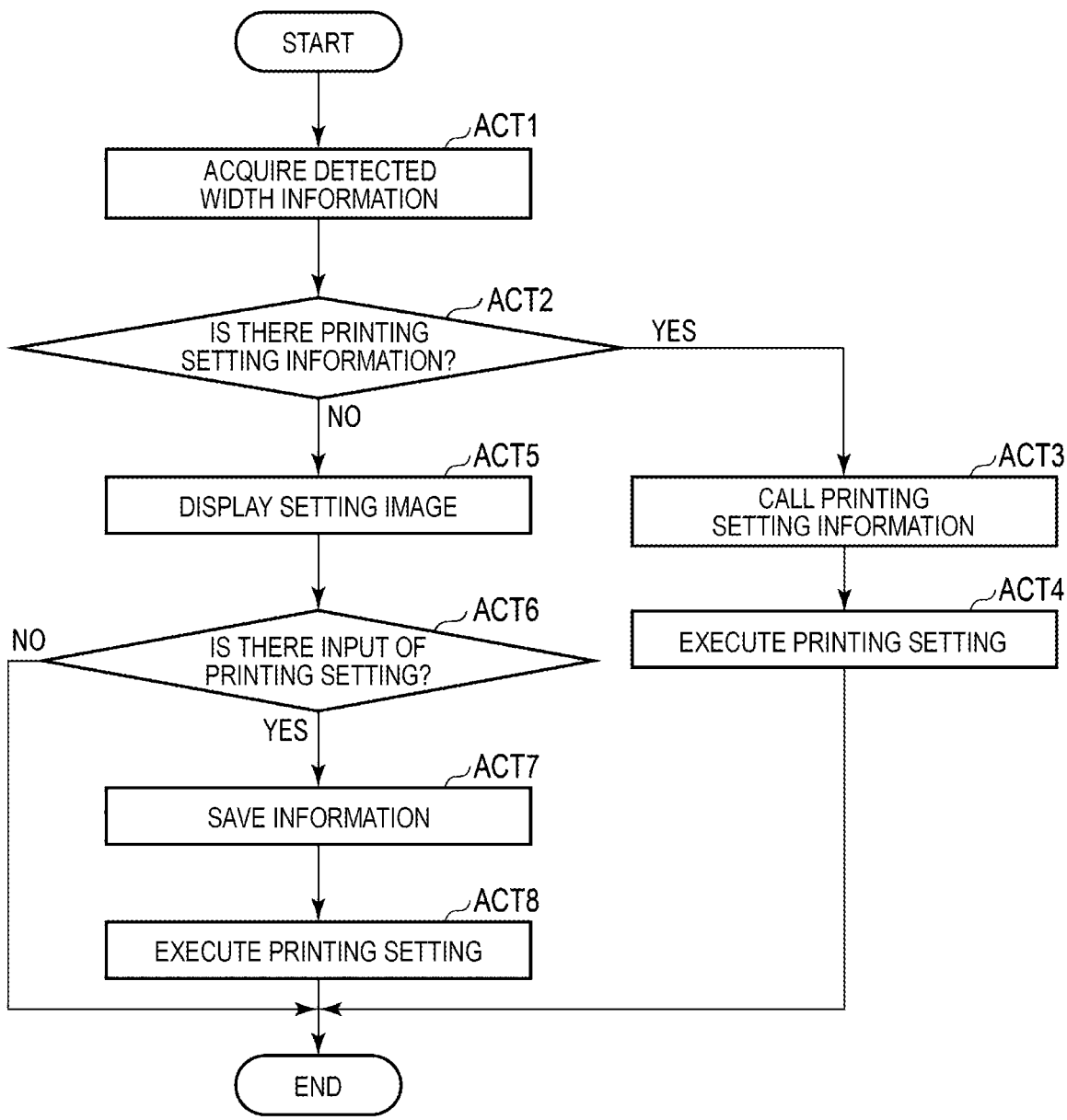
FIG. 7 is a flowchart showing an example of application processing of a printing setting by the printer according to one embodiment.

FIG. 7 is a flowchart showing an example of application processing of the printing setting by the printer 1.

The processing circuit 11 acquires detected width information from the first sensor 17 (ACT 1). In ACT 1, for example, the processing circuit 11 acquires the detected width information based on detection of a printing medium width by the first sensor 17. The processing circuit 11 may acquire the detected width information based on replacement of a printing medium in the printer 1. In this example, the processing circuit 11 detects, based on detection by the second sensor 18, the replacement of the printing medium in the printer 1. The processing circuit 11 acquires the detected width information from the first sensor 17 based on the detection of the replacement of the printing medium in the printer 1. The processing circuit 11 may acquire the detected width information if the power of the printer 1 is turned on. In at least one embodiment, the processing circuit 11 detects that the power of the printer 1 is turned on. The processing circuit 11 acquires the detected width information from the first sensor 17 based on detection indicating that the power of the printer 1 is turned on.

The processing circuit 11 determines whether printing setting information on the printing medium width indicated by the detected width information is stored in the auxiliary storage device 13 (ACT 2). In ACT 2, for example, the processing circuit 11 determines whether the printing medium width indicated by the detected width information matches or substantially matches a registered printing medium width indicated by any registered width information. For example, matching indicates that a printing medium width value indicated by the detected width information is a registered printing medium width value indicated by the registered width information. For example, substantially matching may indicate that the printing medium width value indicated by the detected width information is a value within a predetermined value from the registered printing medium width value indicated by the registered width information. The predetermined value can be set as appropriate. Accordingly, the processing circuit 11 is not affected by a detection error of the printing medium width by the first sensor 17. It is assumed that the processing circuit 11 determines that the printing medium width indicated by the detected width information matches or substantially matches the registered printing medium width indicated by any registered width information. In this case, the processing circuit 11 determines that the auxiliary storage device 13 stores the printing setting information on the printing medium width indicated by the detected width information. It is assumed that the processing circuit 11 determines that the printing medium width indicated by the detected width information does not match or does not substantially match the registered printing medium width indicated by any registered width information. In this case, the processing circuit 11 determines that the printing setting information on the printing medium width indicated by the detected width information is not stored in the auxiliary storage device 13. The printing setting information on the printing medium width indicated by the detected width information is printing setting information on a registered printing medium width that matches or substantially matches the printing medium width indicated by the detected width information.

If the printing setting information on the printing medium width indicated by the detected width information is stored in the auxiliary storage device 13 (ACT 2, YES), the processing proceeds from ACT 2 to ACT 3. If the printing setting information on the printing medium width indicated by the detected width information is not stored in the auxiliary storage device 13 (ACT 2, NO), the process proceeds from ACT 2 to ACT 5.

The processing circuit 11 calls the printing setting information on the printing medium width indicated by the detected width information (ACT 3). In ACT 3, for example, the processing circuit 11 acquires, from the auxiliary storage device 13, the printing setting information on the printing medium width indicated by the detected width information.

The processing circuit 11 executes a printing setting (ACT 4). In ACT 4, for example, the processing circuit 11 applies the printing setting to the printer 1 based on the printing setting information on the printing medium width indicated by the detected width information. The processing circuit 11 can apply the printing setting indicated by the printing setting information to the printer 1.

In this manner, if the printing setting information on the printing medium width indicated by the detected width information is stored in the auxiliary storage device 13, the processing circuit 11 can call the printing setting information. The processing circuit 11 can automatically apply the printing setting indicated by the called printing setting information to the printer 1. Therefore, the processing circuit 11 can efficiently apply a printing setting corresponding to a width of a printing medium to the printer 1. For example, the processing circuit 11 can acquire detected width information based on detection of replacement of a printing medium, and can apply a printing setting to the printer 1. As a result, a user is not required to input a printing setting each time a printing medium is set in the printer 1, thereby improving user convenience. For example, although roll paper having various widths exists, the processing circuit 11 can repeatedly use the printing setting information stored in the auxiliary storage device 13. Therefore, regardless of the width of the roll paper to be replaced, a user does not need to input a printing setting each time the roll paper is set in the printer 1.

The printing unit 14 executes printing on the printing medium based on the printing setting applied to the printer 1. The printing unit (e.g., printer, etc.) 14 can execute the printing processing on the printing medium based on a setting of a printing start position included in the printing setting applied to the printer 1. The printing unit (e.g., printer) 14 can execute the printing processing on the printing medium based on a setting of a printing resolution included in the printing setting applied to the printer 1. The printing unit (e.g., printer) 14 can execute the printing processing on the printing medium based on a setting of a printing density included in the printing setting applied to the printer 1.

The processing circuit 11 displays the setting image IMA on the display device 19 (ACT 5). The display device 19 displays the setting image IMA under the control of the processing circuit 11. In this manner, if the printing setting information on the printing medium width indicated by the detected width information is not stored in the auxiliary storage device 13, the processing circuit 11 displays the setting image IMA on the display device 19. Therefore, a user can easily set a printing setting for the printing medium width indicated by the detected width information.

The processing circuit 11 detects the user's input for a printing setting related to the printing medium width indicated by the detected width information (ACT 6). In ACT 6, for example, the processing circuit 11 detects that the user inputs the printing setting via the input device 16 in the setting image IMA. The processing circuit 11 may detect that the printing setting is input based on the selection of the touch key IMAD by the user via the input device 16. If the processing circuit 11 detects the printing setting input by the user (ACT 6, YES), the processing proceeds from ACT 6 to ACT 7. If the processing circuit 11 does not detect the printing setting input by the user (ACT 6, NO), the processing ends.

The processing circuit 11 stores information in the auxiliary storage device 13 (ACT 7). In ACT 7, for example, the processing circuit 11 stores new registered width information in the auxiliary storage device 13 based on the printing setting input by the user. The new registered width information is registered width information on the printing medium width indicated by the detected width information. A registered printing medium width indicated by the new registered width information is the printing medium width indicated by the detected width information. The processing circuit 11 stores new printing setting information in the auxiliary storage device 13 based on the printing setting input by the user. The new printing setting information is printing setting information on the printing medium width indicated by the detected width information as the registered printing medium width. The new printing setting information is printing setting information indicating the printing setting input by the user. The new printing setting information is correlated with the new registered width information. The processing circuit 11 stores the printing setting information in the auxiliary storage device 13, thereby making it possible to repeatedly use the printing setting information. Therefore, the processing circuit 11 can efficiently apply a printing setting corresponding to the width of a printing medium to the printer 1.

The processing circuit 11 executes a printing setting (ACT 8). In ACT 8, for example, the processing circuit 11 applies a printing setting to the printer 1 based on the new printing setting information. The processing circuit 11 can apply the printing setting indicated by the new printing setting information to the printer 1. The printing unit (e.g., printer) 14 executes printing on a printing medium based on the printing setting applied to the printer 1. As a result, the printing unit (e.g., printer) 14 can execute the printing processing on the printing medium without requiring the user to input the printing setting.

FIG. 8 is a flowchart showing an example of change processing of the printing setting information by the printer 1.

The processing circuit 11 detects a user's input for a display instruction of the list image IMB (ACT 11). In ACT 11, for example, the processing circuit 11 detects that the user inputs the display instruction of the list image IMB via the input device 16. If the processing circuit 11 detects the user's input for the display instruction of the list image IMB (ACT 11, YES), the processing proceeds from ACT 11 to ACT 12. If the processing circuit 11 does not detect the user's input for the display instruction of the list image IMB (ACT 11, NO), the processing circuit 11 continues the processing in ACT 11.

The processing circuit 11 displays the list image IMB on the display device 19 (ACT 12). The display device 19 displays the list image IMB under the control of the processing circuit 11. The user can easily select, by the list image IMB, one registered printing medium width that changes the printing setting information.

The processing circuit 11 detects the user's selection of one registered printing medium width that changes the printing setting information in the list image IMB (ACT 13). In ACT 13, for example, the processing circuit 11 detects that the user selects one registered printing medium width that changes the printing setting information via the input device 16. If the processing circuit 11 detects the user's selection of one registered printing medium width that changes the printing setting information (ACT 13, YES), the processing proceeds from ACT 13 to ACT 14. If the processing circuit 11 does not detect the user's selection of one registered printing medium width that changes the printing setting information (ACT 13, NO), the processing circuit 11 continues the processing in ACT 13.

The processing circuit 11 displays the change image IMC on the display device 19 based on the selection of one registered printing medium width that changes the printing setting information in the list image IMB (ACT 14). In ACT 14, for example, the processing circuit 11 acquires, from the auxiliary storage device 13, the printing setting information on the selected registered printing medium width based on the selection of one registered printing medium width. Hereinafter, the printing setting information on the selected registered printing medium width is also referred to as printing setting information to be changed. The processing circuit 11 displays the change image IMC on the display device 19 based on the acquired printing setting information. The display device 19 displays the change image IMC under the control of the processing circuit 11. The user can easily change at least one setting by the change image IMC.

The processing circuit 11 detects a user's input to change at least one setting in the change image IMC (ACT 15). In ACT 15, for example, the processing circuit 11 detects that a user puts an input to change at least one setting in the change image IMC via the input device 16. The processing circuit 11 may detect the input to change at least one setting based on the user's selection of the touch key IMCD via the input device 16. If the processing circuit 11 detects the user's input to change at least one setting (ACT 15, YES), the processing proceeds from ACT 15 to ACT 16. If the processing circuit 11 does not detect the user's input to change at least one setting (ACT 15, NO), the processing circuit 11 continues the processing in ACT 15.

The processing circuit 11 changes the printing setting information stored in the auxiliary storage device 13 (ACT 16). In ACT 16, for example, the processing circuit 11 changes the printing setting information to be changed based on a change of at least one setting, the change being input in the change image IMC. The processing circuit 11 can reflect the change of at least one setting input in the change image IMC to the printing setting information to be changed.

The above embodiments may be described as follows.

(1) A printing apparatus including:
    a sensor configured to detect a width of a printing medium; and
    a processing circuit configured to acquire detected width information based on detection of the width by the sensor, the processing circuit applying, if printing setting information on the width indicated by the detected width information is stored in a storage, a printing setting to the printing apparatus based on the printing setting information on the width indicated by the detected width information.

(2) The printing apparatus according to (1), in which, if the printing setting information on the width indicated by the detected width information is not stored in the storage, the processing circuit stores, in the storage, the printing setting information on the width indicated by the detected width information based on a user's input for the printing setting related to the width indicated by the detected width information.

(3) The printing apparatus according to (1), in which, if the printing setting information on the width indicated by the detected width information is not stored in the storage, the processing circuit displays, on a display, an image capable of inputting the printing setting related to the width indicated by the detected width information.

(4) The printing apparatus according to (3), in which the image capable of inputting the printing setting related to the width indicated by the detected width information is capable of inputting at least one setting of a printing start position, a printing resolution, and a printing density.

(5) The printing apparatus according to (1), in which the processing circuit displays, on a display, an image showing a list of widths of one or more printing media, in which the printing setting information on each of the widths of one or more printing media is registered.

(6) The printing apparatus according to (5), in which the processing circuit displays, based on selection of one width in the image showing the list, an image capable of changing the printing setting related to the selected width on the display.

(7) The printing apparatus according to (1), further including a printer configured to execute printing processing on the printing medium based on the printing setting applied to the printing apparatus.

(8) The printing apparatus according to (1), in which the processing circuit acquires, based on replacement of the printing medium in the printing apparatus, the detected width information.

(9) The printing apparatus according to (1), in which the printing medium is roll paper.

(10) A printing setting method including:
    acquiring, by a sensor, detected width information based on detection of a width of a printing medium; and
    applying a printing setting to a printing apparatus based on printing setting information on the width indicated by the detected width information if the printing setting information on the width indicated by the detected width information is stored in a storage unit.

In the above-described embodiments, the printer is described as an example of the printing apparatus, but the present disclosure is not limited thereto. The printing apparatus may be a multifunction peripheral (MFP) having a printing function.

The printing apparatus may be a single apparatus that implements each function, or may be formed of a plurality of apparatuses having respective functions.

The above-described embodiments may be applied not only to an apparatus but also to a method executed by the apparatus. The above-described embodiments may be applied to a program capable of causing a computer of the apparatus to execute each function. The above-described embodiments may be applied to a recording medium that stores the program.

The program may be transferred in a state of being stored in the apparatus according to the embodiment, or may be transferred without being stored in the apparatus. In the latter case, the program may be transferred via a network, or may be transferred in a state of being recorded on a recording medium. The recording medium is a non-transitory tangible medium. The recording medium is a computer-readable medium. The recording medium may be a medium such as a CD-ROM and a memory card. Here, the medium can store a program and can be read by a computer, and its form is not limited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing apparatus comprising:
   a sensor configured to detect a width of a printing medium; and
   a processing circuit configured to:
   acquire detected width information based on the detected width of the printing medium;
   determine if printing setting information corresponding to the detected width is stored in a storage;
   in response to determining the printing setting information is stored in the storage, apply a printing setting to the printing apparatus based on the printing setting information; and
   in response to determining the printing setting information corresponding to the detected width is not stored in the storage, display, on a display, an image for a user to select the printing setting related to the detected width, the image including at least one setting of a printing start position, a printing resolution, and a printing density.

2. The apparatus according to claim 1, wherein the processing circuit is further configured to in response to determining the printing setting information corresponding to the detected width is not stored in the storage, store the printing setting information corresponding to the detected width based on a user's input.

3. The apparatus according to claim 1, wherein the processing circuit is further configured to display, on the display, an image showing a list of widths of one or more printing media, wherein the printing setting information on each of the widths of the one or more printing media is registered.

4. The apparatus according to claim 3, wherein the processing circuit is further configured to display, based on the selection of one width, a second image for changing the printing setting related to the selected width on the display.

5. The apparatus according to claim 1, further comprising a printer configured to print on the printing medium based on the printing setting applied to the printing apparatus.

6. The apparatus according to claim 1, wherein the processing circuit is further configured to acquire, based on replacement of the printing medium in the printing apparatus, the detected width information.

7. The apparatus according to claim 1, wherein the printing medium is roll paper.

8. A printing method comprising:
   acquiring, by a sensor, detected width information based on detection of a width of a printing medium;
   acquiring, by a processing circuit, detected width information based on the detected width of the printing medium from the sensor;
   determining, by the processing circuit, if printing setting information corresponding to the detected width is stored in a storage;
   in response to determining the printing setting information is stored in the storage, applying, by the processing circuit, a printing setting to a printing apparatus based on the printing setting information; and
   in response to determining the printing setting information corresponding to the detected width is not stored in the storage, displaying, by the processing circuit, on a display, an image for a user to select the printing setting related to the detected width, the image including at least one setting of a printing start position, a printing resolution, and a printing density.

9. The printing method according to claim 8, further comprising in response to determining the printing setting information corresponding to the detected width is not stored in the storage, storing, by the processing circuit, the printing setting information corresponding to the detected width based on a user's input.

10. The printing method according to claim 8, further comprising displaying, by the processing circuit, on the display, an image showing a list of widths of one or more printing media, wherein the printing setting information on each of the widths of the one or more printing media is registered.

11. The printing method according to claim 10, further comprising displaying, by the processing circuit, based on the selection of one width, a second image for changing the printing setting related to the selected width on the display.

12. The printing method according to claim 8, further comprising printing, by a printer, on the printing medium based on the printing setting applied.

13. The printing method according to claim 8, further comprising acquiring, by the processing circuit, based on replacement of the printing medium in the printing apparatus, the detected width information.

14. The printing method according to claim 8, wherein the printing medium is roll paper.

* * * * *